(12) United States Patent
Jouin et al.

(10) Patent No.: US 9,298,237 B1
(45) Date of Patent: Mar. 29, 2016

(54) VOLTAGE SCALING SYSTEM WITH SLEEP MODE

(75) Inventors: Sebastien Jouin, La Chapelle Launay (FR); Romain Oddoart, Petit Mars (FR); Patrice Menard, Saint-Mars-du-Desert (FR); Mickael Le Dily, Carquefou (FR); Thierry Gourbilleau, Le Loroux-Bottereau (FR)

(73) Assignee: Atmel Corporation, San Jose, CA (US)

( * ) Notice: Subject to any disclaimer, the term of this patent is extended or adjusted under 35 U.S.C. 154(b) by 721 days.

(21) Appl. No.: 13/614,468

(22) Filed: Sep. 13, 2012

(51) Int. Cl.
G06F 1/26 (2006.01)

(52) U.S. Cl.
CPC ...................... *G06F 1/266* (2013.01)

(58) Field of Classification Search
None
See application file for complete search history.

(56) References Cited

U.S. PATENT DOCUMENTS

| | | | |
|---|---|---|---|
| 5,337,284 A | 8/1994 | Cordoba et al. | |
| 5,471,432 A | 11/1995 | Makihara | |
| 5,568,083 A | 10/1996 | Uchiyama et al. | |
| 5,936,455 A | 8/1999 | Kobayashi et al. | |
| 6,175,531 B1 | 1/2001 | Buck et al. | |
| 6,195,298 B1 | 2/2001 | Furutani et al. | |
| 6,348,833 B1 | 2/2002 | Tsujimoto et al. | |
| 6,457,082 B1* | 9/2002 | Zhang et al. | 710/260 |
| 6,956,429 B1 | 10/2005 | Elbanhawy | |
| 7,755,410 B2 | 7/2010 | Oh et al. | |
| 8,575,997 B1 | 11/2013 | Le Dily et al. | |
| 2002/0126561 A1 | 9/2002 | Roohparvar | |
| 2003/0210026 A1* | 11/2003 | Clark et al. | 323/351 |
| 2004/0181643 A1 | 9/2004 | Micheloni et al. | |
| 2005/0218871 A1* | 10/2005 | Kang et al. | 323/265 |
| 2005/0223259 A1 | 10/2005 | Lehwalder et al. | |
| 2007/0115044 A1 | 5/2007 | Chan et al. | |
| 2007/0274148 A1 | 11/2007 | Nitta et al. | |
| 2008/0049505 A1 | 2/2008 | Kim et al. | |
| 2008/0067998 A1* | 3/2008 | Lee et al. | 323/354 |
| 2011/0157976 A1 | 6/2011 | Kuriyama | |
| 2011/0235457 A1 | 9/2011 | Hirata | |
| 2013/0166934 A1 | 6/2013 | Chu | |

OTHER PUBLICATIONS

U.S. Appl. No. 13/592,173, Restriction Requirement mailed May 9, 2013.
U.S. Appl. No. 13/592,173, Notice of Allowance mailed Jul. 2, 2013.
U.S. Appl. No. 14/042,303, Non-Final OA dated May 28, 2014 (10 pages).
U.S. Appl. No. 14/042,303, Final Office Action dated Nov. 13, 2014, 11 pages.
U.S. Appl. No. 13/614,467, Non-Final OA, dated Dec. 23, 2014, 14 pages.

* cited by examiner

*Primary Examiner* — Kim Huynh
*Assistant Examiner* — Paul J Yen
(74) *Attorney, Agent, or Firm* — Fish & Richardson P.C.

(57) ABSTRACT

A voltage scaling system can scale a supply voltage while preventing processor access of system components that are rendered unstable from the scaling. A processor receives an instruction to scale a system supply voltage to a target supply voltage. The processor executes the instruction and enters into a sleep mode. The processor can send, to a controller that saves power, an indication that the processor is in the sleep mode. When the processor is in the sleep mode, the processor becomes inactive and cannot access any components, e.g., Flash memory data, of the voltage scaling system. The controller can configure a voltage regulator to scale the system supply voltage to the target supply voltage. Once the target supply voltage is reached, the voltage regulator sends an interrupt to the processor, thereby waking up the processor from the sleep mode.

18 Claims, 3 Drawing Sheets

VOLTAGE SCALING SYSTEM WITH SLEEP MODE

TECHNICAL FIELD

This disclosure relates generally to electronics and more particularly to voltage scaling systems.

BACKGROUND

A system can use a voltage regulator to scale supply voltages. The voltage regulator maintains a constant voltage level until instructed to supply a different voltage level. Generally, transitioning from a voltage value to a lower voltage value can take a significantly longer time than transitioning from the voltage value to a higher voltage value.

By decreasing supply voltages, the system can achieve lower power consumption. When the system dynamically changes a supply voltage, certain operations should be halted until the supply voltage is stabilized. For example, Flash memory data fetches should be halted until the Flash memory is recalibrated with the updated voltage supply value. The time required to stabilize the voltage is generally unpredictable and can have a negative impact on system latency.

SUMMARY

A voltage scaling system can scale a supply voltage while preventing processor access of system components that are rendered unstable from the scaling. A processor receives an instruction to scale a system supply voltage to a target supply voltage. The processor executes the instruction and enters into a sleep mode. The processor can send, to a controller that saves power, an indication that the processor is in the sleep mode. When the processor is in the sleep mode, the processor becomes inactive and cannot access any components, e.g., Flash memory data, of the voltage scaling system. The controller can configure a voltage regulator to scale the system supply voltage to the target supply voltage. Once the target supply voltage is reached, the voltage regulator sends an interrupt to the processor, thereby waking up the processor from the sleep mode.

In one aspect, a method performed by a circuit for scaling voltage includes receiving an instruction to scale a system supply voltage to a target supply voltage; placing a processor into a sleep mode, where the sleep mode halts a clock of the processor; receiving an indication that the processor is in the sleep mode; scaling the supply voltage to the target supply voltage using a voltage regulator; in response to the scaling, waking up the processor from the sleep mode with an interrupt signal, where the interrupt signal is sent by the voltage regulator when the system supply voltage has reached the target supply voltage.

Particular implementations of the voltage scaling system can provide one or more of the following advantages: 1) the voltage scaling system can prevent processor access of components while a system supply voltage is transitioning; and 2) the voltage scaling system can be implemented with low cost by utilizing existing sleep mode and interrupt circuitry.

The details of one or more disclosed implementations are set forth in the accompanying drawings and the description below. Other features, aspects, and advantages will become apparent from the description, the drawings and the claims.

DETAILED DESCRIPTION

Example Voltage Scaling System

Figure 1:
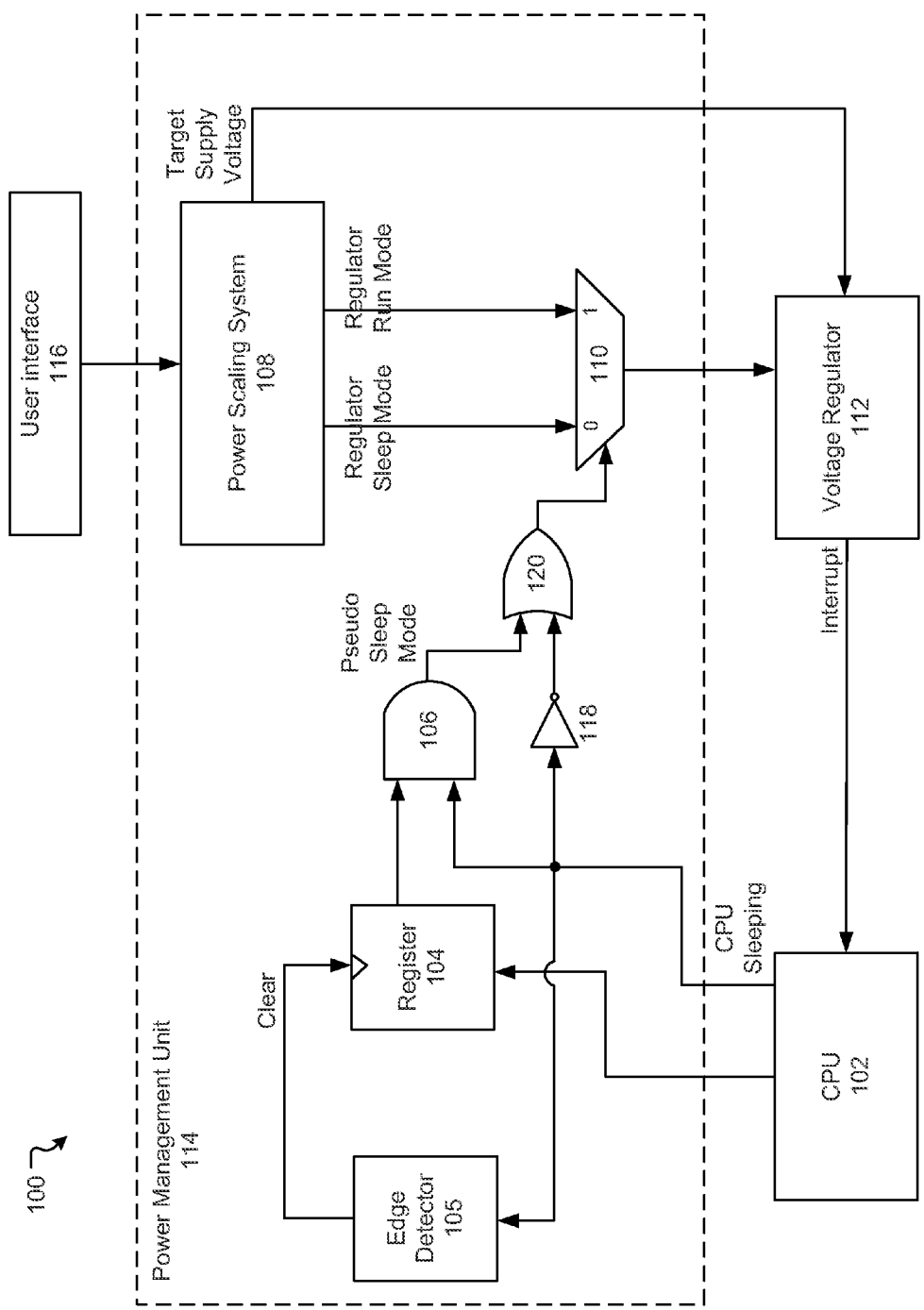
FIG. 1 is a schematic diagram of an example voltage scaling system.

FIG. 1 is a schematic diagram of an example voltage scaling system 100. The voltage scaling system 100 includes a power management unit 114. The power management unit 114 can act as a controller that saves power for the voltage scaling system 100. The voltage scaling system 100 also includes a central processing unit (CPU) 102. The CPU 102 receives and executes instructions of a computer program, e.g., from Flash memory data. The CPU 102 can communicate with the power management unit 114. In particular, the CPU 102 can indicate to the power management unit 114 whether it is in a sleep mode, e.g., through a CPU sleeping flag. In the sleep mode, a clock of the CPU 102 is turned off and the CPU 102 is halted, thereby being unable to access any components, e.g., Flash memory data.

The voltage scaling system 100 includes a voltage regulator 112. The voltage regulator 112 provides a system supply voltage to the voltage scaling system 100 and other systems coupled to the system supply voltage, e.g., a third party chip. The voltage regulator 112 can adjust the system supply voltage upon receiving an instruction, e.g., from the power management unit 114. The voltage regulator 112 can send an interrupt to the CPU 102 when the system supply voltage has finished transitioning to the target supply voltage. The interrupt will be described further below in reference to FIG. 2.

The power management unit 114 includes a register 104. The register 104 can be a control bit that tracks whether the CPU 102 is requesting a voltage scaling. The CPU 102 can drive the register 104 based on instructions that are being executed. If the register 104 is high, the voltage scaling system 100 is or will be transitioning the system supply voltage. If the register 104 is low, the voltage scaling system 100 is not transitioning the system supply voltage.

The power management unit 114 includes an edge detector 105. The edge detector processes, as input, the CPU sleeping flag. Based on the flag, the edge detector 105 can clear the register 104.

The power management unit 114 includes an AND gate 106, a NOT gate 118, and an OR gate 120. The AND gate 106 can have two inputs: 1) output of the register 104, and 2) the CPU sleeping flag. Output of the AND gate 106 can be a first input to the OR gate 120. The CPU sleeping flag can be an input to the NOT gate 118, and an output of the NOT gate 118 can be a second input to the OR gate 120. Output of the OR gate 120 can control operation of a multiplexor 110.

The power scaling system 108 can control an operating mode of the voltage regulator 112. The voltage regulator 112 can operate in a run mode or a sleep mode. In the run mode, the voltage regulator 112 can receive a target supply voltage that is established by a user, e.g., using a user interface 116. For example, the power scaling system 108 can obtain the target supply voltage from the user interface 116 and provide the target supply voltage to the voltage regulator 112. The voltage regulator 112 can execute a power scaling sequence to transition the system supply voltage to the target supply voltage. In the sleep mode, the voltage regulator 112 is inactive or in a low power mode, e.g., a mode that consumes a small amount of current. This can save energy for the voltage scaling system 100.

In some implementations, the power scaling system 108 controls an operating mode of the CPU 102. Similar to the voltage regulator 112, the CPU 102 can also operate in a run mode or in a sleep mode. In the run mode, the CPU 102 and other components coupled to the CPU 102 are active. In the sleep mode, the CPU 102 is halted and no instructions are fetched.

The power scaling system 108 can provide the two operating modes of the voltage regulator 112 as inputs to the multiplexor 110. The multiplexor 110 can use output of the OR gate 120 as a control bit for the multiplexor 110. Therefore, the multiplexor 110 can pass, to the voltage regulator 112, a voltage regulator operating mode based on the output of the OR gate 120. The voltage regulator 112 can operate at a mode specified by the output of the multiplexor 110.

Example Voltage Scaling System Flowchart

Figure 2:
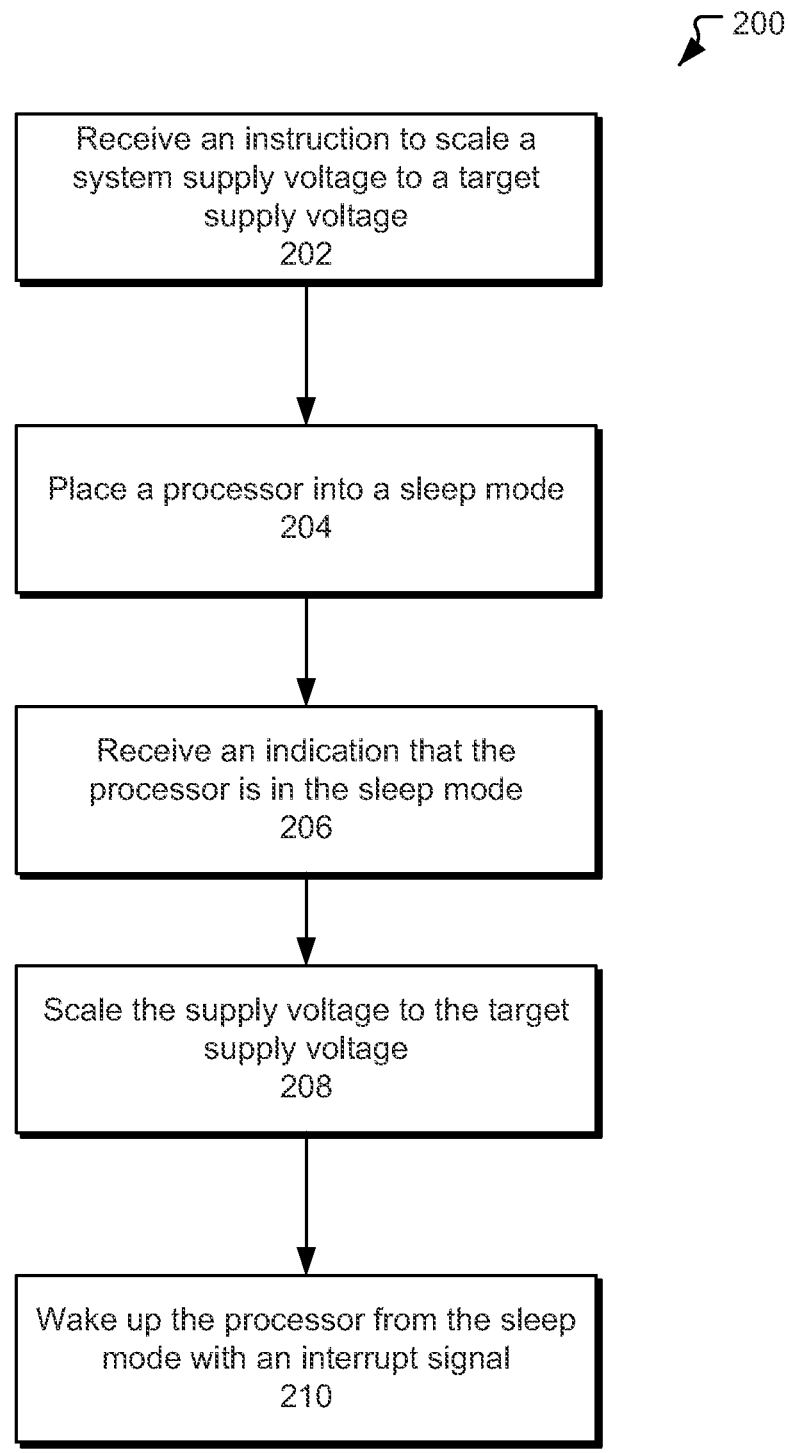
FIG. 2 is a flow diagram of an example process performed by a voltage scaling system.

FIG. 2 is a flow diagram of an example process performed by a voltage scaling system, e.g., the voltage scaling system 100 described above in reference to FIG. 1. A voltage scaling system 100 can receive instructions, e.g., from a user interface or a third party system, to downscale or upscale voltage using a voltage regulator 112 (step 202). The instructions can include a target supply voltage for the voltage regulator 112. Upon receiving the instructions, the voltage scaling system 100 sets a register 104 as high to start a voltage scaling sequence. In some implementations, when the register 104 is set to high, the voltage scaling system 100 can send a sleep instruction to a CPU 102.

The voltage scaling system 100 places the CPU 102 into a sleep mode (step 204) when executing the sleep instruction. When the CPU 102 has entered the sleep mode, a CPU sleeping flag is set to high. The voltage scaling system 100 receives an indication that the CPU 102 is in the sleep mode (step 206). Because output of the register 104 and the CPU sleeping flag are both high, output of the AND gate 106 is also high.

If output of the AND gate 106 is high, a power scaling system 108 of the voltage scaling system 100 enters a pseudo sleep mode. Pseudo sleep mode is similar to a system wide sleep mode except the voltage regulator 112 is in a run mode instead of a sleep mode. The sleep mode can be temporary, e.g., the sleep mode lasts until the voltage regulator has reached a target value. This allows the voltage regulator to transition the system supply voltage while the CPU 102 and other components remain in sleep mode, e.g., inactive. By being inactive, the CPU 102 will not access components that are rendered unstable due to the voltage transition.

The output of the AND gate 106 if a first input to the OR gate 120. The NOT gate 118 inverses the CPU sleeping flag, and output of the NOT gate is a second input to the OR gate 120. That is, if the CPU sleeping flag is low, e.g., the CPU is not sleeping, the NOT gate 118 inverses the low signal and outputs a high signal, which would also cause the OR gate 120 to output a high signal. If the CPU sleeping flag is high and the register 104 is low, the output of the OR gate 120 would be low. If the register 104 is high and the CPU sleeping flag is high, the output of the OR gate 120 would be high.

A power management unit 114 controls operation of the voltage regulator 112. As described above in reference to FIG. 1, the power scaling system 108 of the power management unit 114 provides two possible operating modes for the voltage regulator 112: 1) regulator sleep mode and 2) regulator run mode. The power scaling system 108 passes both modes as inputs to the multiplexor 110. Output of the OR gate 120 acts as a control bit for the multiplexor 110. If the voltage scaling system 100 is in a pseudo sleep mode, e.g., output of the AND gate 106 is high, the multiplexor 110 passes through the regulator run mode to the voltage regulator 112 even if the voltage scaling system 100 is in sleep mode. The voltage regulator 112 then scales the system supply voltage to the target supply voltage (step 208). On the other hand, if the voltage scaling system 110 is not in the pseudo sleep mode, e.g., output of the AND gate 106 is low, the multiplexor 110 passes through the regulator run mode or the regulator sleep mode based on a low or a high CPU sleeping signal, respectively. Output of the multiplexor 110 controls the operating mode of the voltage regulator 112.

In a regulator run mode, once the voltage regulator 112 reaches the target supply voltage, the voltage regulator 112 sends an interrupt signal to the CPU 102 (step 210). The interrupt signal wakes up the CPU 102 from the sleep mode. In some implementations, while in a pseudo sleep mode, the voltage scaling system 100 masks any interrupts except the interrupt from the voltage regulator 112. This can prevent interrupts from being lost. For example, another system, e.g., an alarm, can try to interrupt the CPU 102 in a sleep mode, but the voltage scaling system 100 can mask the interrupt by placing the interrupt in a queue. Once the voltage regulator 112 delivers the interrupt to awaken the CPU 102 from the sleep mode, the voltage scaling system 100 forwards queued interrupts to the CPU 102.

If the CPU 102 is no longer in the sleep mode, the CPU sleeping flag is set to low. The edge detector 105 can detect the falling edge of the CPU sleeping flag and clear the register 104, e.g., set the output of the register 104 as low. The register 104 and CPU sleeping flag both output a low signal, and therefore the output of the AND gate 106 is low. When the output of the AND gate 106 is low, the voltage scaling system 100 exits the pseudo sleep mode.

Example Timing Diagram

Figure 3:
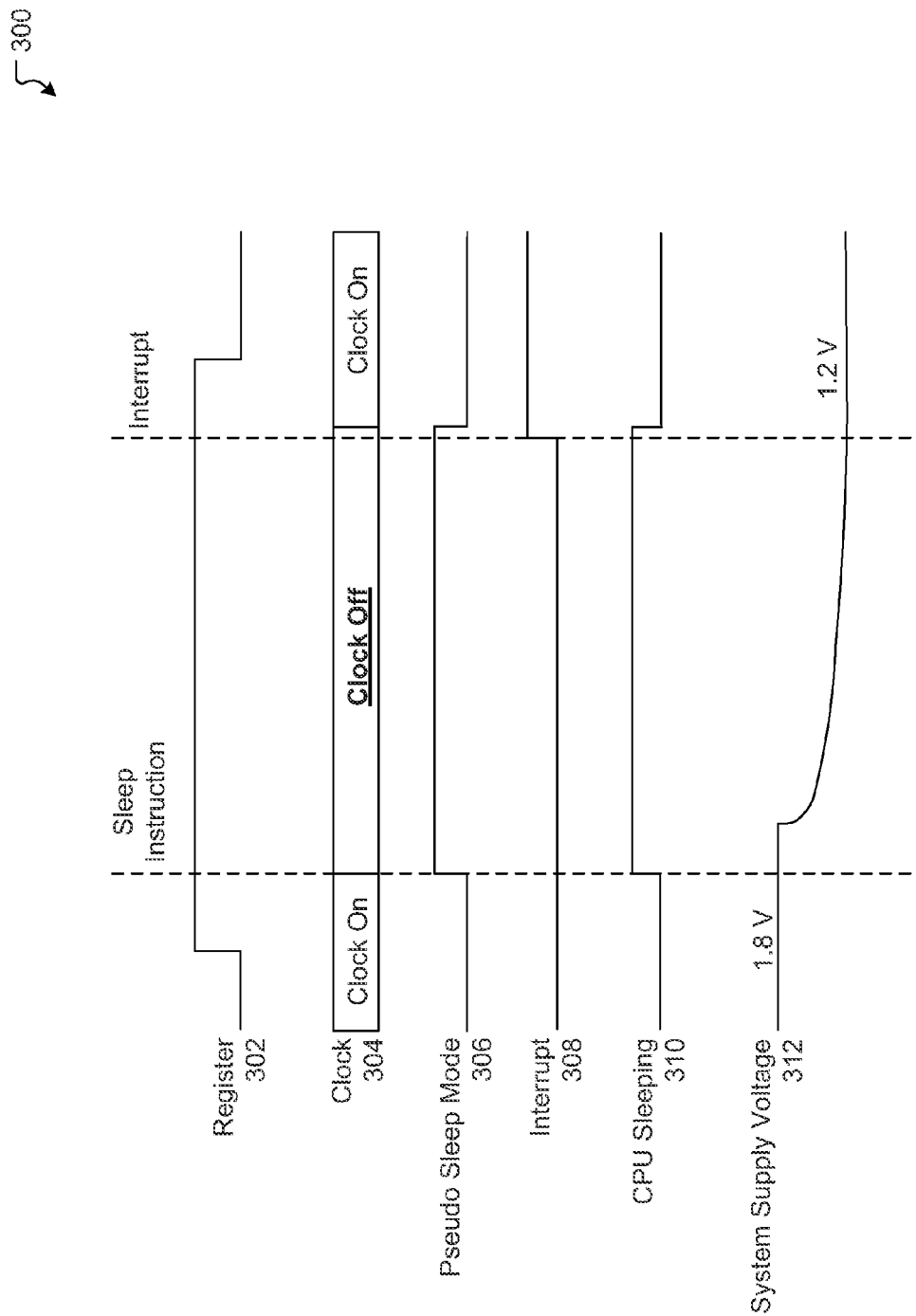
FIG. 3 is an example timing diagram of a voltage scaling system that receives an instruction to downscale a system supply voltage.

FIG. 3 is an example timing diagram 300 of a voltage scaling system that receives an instruction to downscale a system supply voltage. For example, the instruction can be to downscale the system supply voltage from 1.8 Volts to 1.2 Volts. In some implementations, if the instruction is to upscale the system supply voltage, the diagram 300 described below generally applies with the exception of the system supply voltage 312 graph, e.g., the system supply voltage graph 312 will start at a low voltage and transition to a high voltage.

Once the voltage scaling system receives the instruction, a register 302 becomes high. A clock 304 of a CPU is on. A pseudo sleep mode flag 306, an interrupt from the voltage regulator 308, and a CPU sleeping flag 310 are low. The pseudo sleep mode flag 306 represents an output of an AND gate, e.g., as described above in reference to FIGS. 1 and 2, of the voltage scaling system. A system supply voltage 312 is high, e.g., 1.8 Volts.

A CPU can execute a sleep instruction after the register 302 becomes high. Once the sleep instruction is executed, the clock 304 can turn off. As a result, the CPU sleeping flag 310 becomes high. Because both the register 302 and the CPU sleeping flag 310 are high, the pseudo sleep mode 306 is high. In pseudo sleep mode 306, the voltage regulator is in a run mode and, based on the received instruction, starts downscaling the system supply voltage 312. As shown in the diagram, downscaling the system supply voltages occurs gradually and not instantaneously, and the CPU is inactive during the downscaling. If the CPU is inactive, the clock is frozen and data fetch, e.g., instructions in Flash memory, is halted.

As soon as the voltage regulator reaches the target supply voltage, e.g., 1.2 Volts, the voltage regulator sends an interrupt 308, e.g., the interrupt 308 becomes high, to the CPU. The CPU exits sleep mode upon receipt of the interrupt. This causes the clock 304 to turn on and the CPU sleeping flag 310 to become low. When the CPU sleeping flag 310 becomes low, an edge detector detects the falling edge and clears the register 302, thereby setting the register 302 to low. Pseudo sleep mode 306 becomes low once the CPU sleeping flag 310 is low. Once the voltage scaling system exits pseudo sleep mode 306, the CPU continues executing instructions and the voltage regulator remains in run mode because the CPU sleeping flag 310 is low. In some implementations, as shown in the timing diagram 300, rising and falling edges, e.g., the falling edge of pseudo sleep mode 306 and the falling edge of CPU sleeping flag 310, are slightly delayed due to processing delay by the voltage scaling system.

While this document contains many specific implementation details, these should not be construed as limitations on the scope what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can, in some cases, be excised from the combination, and the claimed combination may be directed to a sub combination or variation of a sub combination.

What is claimed is:

1. A method performed by a circuit for scaling voltage, the method comprising:
    receiving an instruction to scale a system supply voltage to a target supply voltage;
    placing a processor into a sleep mode, where the sleep mode halts a clock of the processor;
    receiving, at a first input of a logic gate, an indication that the processor is in the sleep mode;
    receiving, at a second input of the logic gate, an output of a register that is configured to be in a first state upon receipt of the instruction to scale the system supply voltage to the target supply voltage;
    setting an output of the logic gate to a first value in response to receiving the indication that the processor is in the sleep mode and receiving the output of the register in the first state;
    based on setting the output of the logic gate to the first value, providing a signal to a voltage regulator to scale the system supply voltage to the target supply voltage;
    scaling the system supply voltage to the target supply voltage using the voltage regulator upon providing the signal to the voltage regulator; and
    in response to the scaling, waking up the processor from the sleep mode with an interrupt signal, where the interrupt signal is sent by the voltage regulator when the system supply voltage has reached the target supply voltage.

2. The method of claim 1, where the voltage regulator is operating when the processor is in the sleep mode.

3. The method of claim 1, where the instruction is sent by a user through a user interface.

4. The method of claim 1, where the waking comprises:
    receiving an updated indication that the processor is no longer in the sleep mode.

5. The method of claim 4, where the updated indication is detected by an edge detector.

6. The method of claim 1, where prior to the waking, masking any interrupt other than the interrupt signal from the voltage regulator.

7. A system for scaling voltage, comprising:
    a processor that provides an indication of whether the processor is in a sleep mode, where the sleep mode halts a clock of the processor;
    a logic gate that is configured to:
        receive, at a first input of the logic gate, the indication that the processor is in the sleep mode;
        receive, at a second input of the logic gate, an output of a register that is configured to be in a first state upon receipt of an instruction to scale a system supply voltage to a target supply voltage; and
        set an output of the logic gate to a first value in response to receiving the indication that the processor is in the sleep mode and receiving the output of the register in the first state;
    a multiplexor that is configured to provide a signal to a voltage regulator to scale the system supply voltage to the target supply voltage in response to setting the logic gate to the first value; and
    the voltage regulator that is configured to scale the system supply voltage to the target supply voltage when the processor is in the sleep mode, where the voltage regulator sends an interrupt signal to the processor when the target supply voltage is reached, where the interrupt signal causes the processor to wake up from the sleep mode.

8. The system of claim 7, further comprising:
    a controller configured to provide the target supply voltage to the voltage regulator.

9. The system of claim 8, where the controller is configured to run the voltage regulator when the processor is in the sleep mode.

10. The system of claim 8, where before sending the interrupt signal, the controller is configured to mask any interrupt signal other than the interrupt signal from the voltage regulator.

11. A circuit for scaling voltage, comprising:
    a processor, where the processor provides a flag that indicates whether the processor is in a sleep mode, and where the processor enters into the sleep mode based on a received instruction to scale a system supply voltage to a target supply voltage;
    a register that enables voltage scaling for the system, where the register is configured to be high upon receipt of the received instruction and low otherwise;
    one or more logic gates having the flag of the processor as a first input and an output of the register as a second input;
    a voltage regulator having a run operating mode and a sleep operating mode, where the run operating mode transitions the system supply voltage to the target supply voltage, where the sleep operating mode renders the voltage regulator inactive or running with low power, and where in the run operating mode, the voltage regulator sends an interrupt signal to the processor upon reaching the target supply voltage, where the interrupt signal wakes up the processor from the sleep mode;
    a power scaling system that provides signals of both operating modes for the voltage regulator; and a multiplexor that forwards one of the signals provided by the power scaling system based on the output of the one or more logic gates, where the voltage regulator operates on a mode indicated by the forwarded signal.

12. The circuit of claim 11, further comprising:
an edge detector that clears the register, where the edge detector detects a falling edge of the flag of the processor.

13. The circuit of claim 11, where the one or more logic gates comprises:
an AND gate having the flag of the processor as the first input of the AND gate and the output of the register as the second input of the AND gate;
a NOT gate having the flag of the processor as an input of the NOT gate; and
an OR gate having output of the AND gate as a first input of the OR gate and output of the NOT gate as a second input of the OR gate, where output of the OR gate is the output of the one or more logic gates.

14. The circuit of claim 13, where if the output of the OR gate is high, the run operating mode is passed to the voltage regulator through the multiplexor, and where if the output of the OR gate is low, the sleep operating mode is passed to the voltage regulator through the multiplexor.

15. The circuit of claim 11, where the power scaling system provides the target supply voltage to the voltage regulator.

16. The method of claim 1, wherein providing the signal to the voltage regulator to scale the system supply voltage to the target supply voltage comprises:
receiving, at a multiplexor, signals provided by a power scaling system for controlling an operating mode of the voltage regulator, wherein the operating mode of the voltage regulator is one of a run operating mode and a sleep operating mode, where the run operating mode transitions the system supply voltage to the target supply voltage and the sleep operating mode renders the voltage regulator inactive or running with low power, and where, in the run operating mode, the voltage regulator sends the interrupt signal to the processor;
receiving, at the multiplexor, the output of the logic gate; and
providing, by the multiplexor and to the voltage regulator, a signal corresponding to the run operating mode upon receiving the output of the logic gate at the first value.

17. The method of claim 1, wherein setting the output of the logic gate to the first value comprises setting the output of the logic gate to a high value.

18. The system of claim 7, wherein setting the output of the logic gate to the first value comprises setting the output of the logic gate to a high value.

* * * * *